No. 626,453. Patented June 6, 1899.
J. E. BEACH.
SEEDER ATTACHMENT FOR GANG PLOWS.
(Application filed Dec. 7, 1898.)
(No Model.)
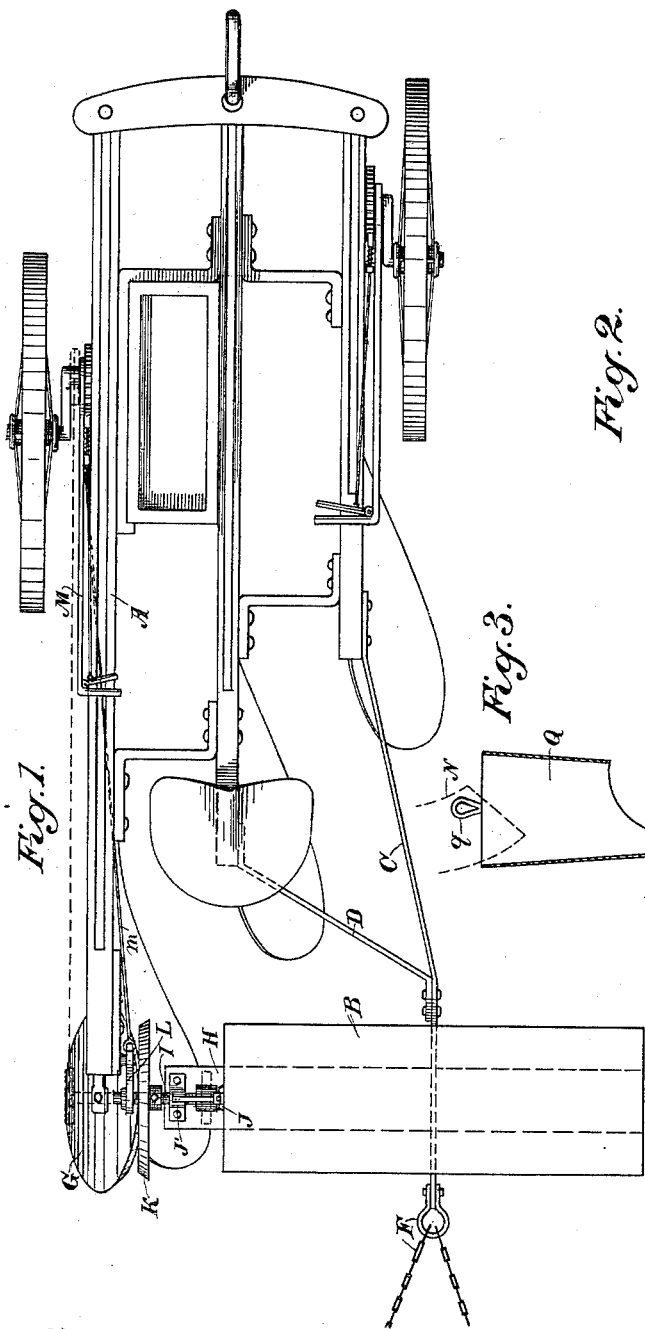
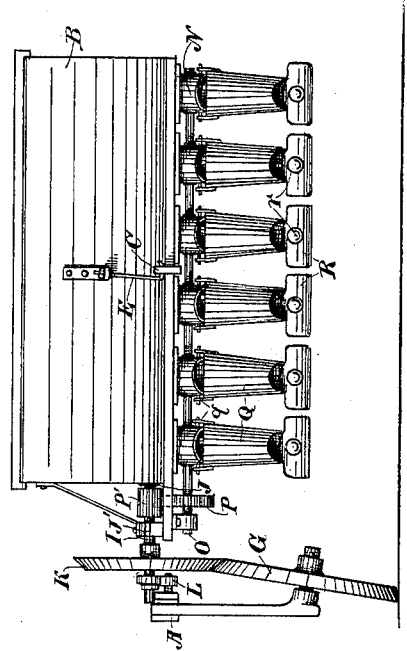
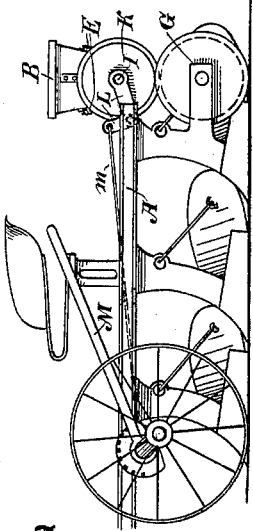
Witnesses,
Inventor,
James E. Beach

UNITED STATES PATENT OFFICE.

JAMES E. BEACH, OF ROUTIER, CALIFORNIA.

SEEDER ATTACHMENT FOR GANG-PLOWS.

SPECIFICATION forming part of Letters Patent No. 626,453, dated June 6, 1899.

Application filed December 7, 1898. Serial No. 698,525. (No model.)

*To all whom it may concern:*

Be it known that I, JAMES E. BEACH, a citizen of the United States, residing at Routier, county of Sacramento, State of California, have invented an Improvement in Grain-Seeder Attachments for Gang-Plows; and I hereby declare the following to be a full, clear, and exact description of the same.

My invention relates to a device for seeding ground after it has been plowed and a means for connecting and supporting the seeder frame or box from the plow-frame and also a harrow to follow the same.

It consists, essentially, in details of construction, which will be more fully explained by reference to the accompanying drawings, in which—

Figure 1 is a plan view of the plow and seedbox. Fig. 2 is a rear view of the seedbox and connections. Fig. 3 is a section through a distributing-pipe. Fig. 4 is an elevation of the left side of the plow.

The object of my invention is to provide a convenient removable seeding attachment for gang-plows with mechanism actuated directly from the lever of the plow whereby the seeder can be thrown into operation when the plows are at work and correspondingly thrown out of operation when the plows are disengaged.

A is the frame of a gang-plow of any suitable or desired construction, and B is a seedbox which it is desired to support in proper relation to the plows. This is effected by means of an arm C, which is bolted to the right side beam of the plow-frame and extends rearwardly to a distance sufficient to support the box B behind the rearmost of the plows.

D is a brace bent so as to extend diagonally from the second plow-beam to the arm C, being bolted at one end to the plow-beam and at the other to the arm C, just in front of the seedbox. The arm extends rearwardly beneath the box B and is preferably let into the bottom of the box sufficiently to clear the shaft which actuates the feeders, as will be hereinafter described. The box rests transversely and about centrally upon the bar and can be easily tilted thereon.

Upon the front and rear of the seedbox B are attachments for hook-bolts E. Holes are made through the arm C, which are engaged by the hooks, so that the seedbox is firmly supported upon the arm, but is allowed a tilting motion endwise for a purpose to be hereinafter described.

The rear end of the arm C is provided with a link or attachment for the chain F, by which the harrow is drawn behind the seedbox and serves to cover the grain which has been distributed therefrom.

In the present case I have shown a plow of that class in which an angularly-journaled beveled wheel G supports the rear left side of the plow-frame, and this wheel by reason of its position and the bevel upon it travels in contact with the solid vertical side of the furrow turned by the last plow, thus acting as a rolling landside to prevent the plows being forced over in that direction.

The bottom board H of the seedbox is extended to a short distance to the left side, as shown, and upon this extended bottom is journaled a shaft I, one end of which turns in a box J upon the end of the seedbox and the other turns in a box J', fixed upon the platform H. Upon the outer end of the shaft I is mounted a wheel K, the periphery of which is beveled, so that it may turn in contact with the beveled edge of the wheel G of the plow, and the position of the seedbox and shaft is such that the wheel K stands directly above the wheel G, so that by tilting the box upon its supporting-bar C the wheel K may be lifted clear of the wheel G or depressed into contact with it. In order to make this operation coincident with putting the plows into the ground or lifting them out, I have here shown a bell-crank lever L fulcrumed upon the plow-frame and one end of it fitting over the outer end of the shaft I. The other end of the bell-crank lever is connected by a rod *m* or other connection with the lever M, which operates to throw the plows in or out of the ground, so that when the plows are in the ground turning the furrows the wheel K will be depressed, with its periphery contacting with that of the wheel G, and will be rotated and through connections hereinafter described will actuate the seeder mechanism. When the plows are thrown out of the ground by the movement of the lever M, the wheel K will be lifted out of contact with the wheel G, the box B tilting upon its support so as to allow of this disengagement, and by reason of this tilting support the box, with its extension H and the shaft and wheel K, form a rigid connection all movable about the common fulcrum.

The feed mechanism may be of any usual or well-known form and is contained in the feed-cups N beneath the seedbox. A shaft O passes through these feed-cups, and upon the shaft interior to these connections are fixed the feed devices, which cause the seed to flow down and discharge through the lower ends of the cups N.

In order to rotate the shaft O, I have shown a gear-wheel P fixed upon the shaft and the pinion P' fixed upon the shaft I, so that the rotation of the latter shaft will drive the shaft which actuates the feeders. Below these feeders are suspended the spreader-pipes Q, which have lugs $q$ at the top, by which they are loosely suspended from the feed-cups, and grain delivered from the feed-cups will pass down through these pipes. At the lower ends the pipes are cut away toward the rear and discharge upon inclined surfaces R. Each of these surfaces has a raised convex spreader $r$, upon which the grain falls as it passes down through the pipe Q, and, striking on these raised surfaces, the grain is scattered out sidewise and is evenly spread over the surface of the ground. The object of the pipes carrying the grain from the cups to the spreaders is to prevent the wind from striking the seed and carrying it in a direction not desired. By loosely suspending these pipes Q, as shown, they can easily swing, so that in case they strike any obstruction they will temporarily swing backward until they pass.

It will be understood that, if desired, the shaft I may be extended sufficiently to stand in line with the left front plow-wheel and by means of sprockets and connecting-chains the seeder might be driven in this manner, as shown in dotted lines, Fig. 1. This construction would be applicable to such gang-plows as are not provided with a rear furrow-wheel.

Having thus described my invention, what I claim as new, and desire to secure by Letters Patent, is—

1. The combination with a gang-plow of a braced bar fixed to the plow-frame extending rearwardly therefrom, a seedbox supported upon the rear end of said bar and means by which the box may be tilted upon the support.

2. The combination with a gang-plow of a rearwardly-extending supporting-bar fixed to the plow-frame, a seedbox extending transversely across said bar with its center supported thereon and hook-bolts by which it is fixed thereto, contact-wheels by which the feed mechanism is driven, and a means for disengaging said wheels to discontinue the feed.

3. The combination with a gang-plow of a rearwardly-projecting supporting-bar, a seedbox the center of which rests upon said bar and connections by which it is tiltably supported thereon, an extension of the bottom of said box, a shaft journaled upon said extension with intermediate connections by which the feed devices are actuated, a beveled wheel fixed to the outer end of the shaft, a correspondingly-beveled furrow-wheel supporting the rear end of the plow and mechanism by which the seedbox may be tilted upon its support to engage or disengage said wheels.

4. The combination with a gang-plow of a rearwardly-extending arm, a transversely-placed seedbox the center of which is supported upon and attached to the said arm, an extension of the floor of the seedbox, a shaft journaled in boxes thereon, a beveled wheel fixed upon the end of the shaft in line above the correspondingly-beveled rear furrow-wheel of the plow, a bell-crank lever fulcrumed upon the plow-beam having one end connected with the shaft of the first-named bevel-wheel, and the other arm connected with the lever by which the plows are thrown out of and into the ground, so that the seeder is stopped and started in unison with the movement of said lever and the plows.

5. The combination with a gang-plow of a seedbox, an arm fixed to the plow-frame extending rearwardly and centrally beneath the seedbox which is tiltably supported and fixed thereon, and means for securing the box in position, feed devices extending below the box, a rotary shaft by which said devices are actuated, an extension from the end of the seedbox with a shaft journaled thereon, gears upon this shaft and upon the feed-shaft whereby the latter is rotated, a beveled contact-wheel fixed upon the outer end of the drive-shaft and adapted to contact with the correspondingly-beveled rear furrow-wheel of the plow, and means for engaging and disengaging said wheels so that the feed stops when the plows are out of the ground and starts when they are in the ground.

6. The combination with a gang-plow of a bar fixed to the plow-frame and extending rearwardly therefrom, attachments by which a transversely-tiltable seedbox is fixed and supported upon the bar behind the plows, and a harrow and attachments by which it is connected with the rear end of the bar.

In witness whereof I have hereunto set my hand.

JAMES E. BEACH.

Witnesses:
   THOS. J. COX,
   J. P. COUNTS.